US007933683B2

(12) United States Patent
Asaoka et al.

(10) Patent No.: US 7,933,683 B2
(45) Date of Patent: Apr. 26, 2011

(54) PARTITION PLATE USABLE FOR V-MEASURE IN MEDICINE HOLDING MACHINE

(75) Inventors: Chisei Asaoka, Osaka (JP); Koji Yamashita, Osaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 415 days.

(21) Appl. No.: 12/280,771

(22) PCT Filed: Oct. 11, 2007

(86) PCT No.: PCT/JP2007/069817

§ 371 (c)(1),
(2), (4) Date: Aug. 26, 2008

(87) PCT Pub. No.: WO2008/047661

PCT Pub. Date: Apr. 24, 2008

(65) Prior Publication Data

US 2009/0255952 A1 Oct. 15, 2009

(30) Foreign Application Priority Data

Oct. 16, 2006 (JP) ................................ 2006-281402

(51) Int. Cl.
*G06F 17/00* (2006.01)

(52) U.S. Cl. ........ 700/242; 700/240; 700/243; 700/244; 221/174

(58) Field of Classification Search .................. 221/174; 700/240, 243, 244
See application file for complete search history.

(56) References Cited

U.S. PATENT DOCUMENTS 4,693,355 A * 9/1987 Bochi et al. .................. 193/2 R
5,765,655 A * 6/1998 Tatsuoka .................... 177/25.18
5,787,678 A * 8/1998 Koike et al. .................. 221/133
6,825,424 B2 * 11/2004 Yonetsu et al. ............ 177/25.18

FOREIGN PATENT DOCUMENTS

JP 58047729 B2 3/1983
JP 2577449 Y2 7/1998
JP 2002-136574 A 5/2002
JP 3366823 B2 1/2003
JP 3479673 B2 12/2003

OTHER PUBLICATIONS

International Search Report dated Dec. 4, 2007 for PCT/JP2007/069817 as published in WO 2008/047661 A1.
Written Opinion of the International Searching Authority dated Nov. 10, 2007 for PCT/JP2007/069817 (in Japanese, 3 pages).

* cited by examiner

*Primary Examiner* — Timothy R Waggoner
(74) *Attorney, Agent, or Firm* — Jones Day; Christopher C. Bolten

(57) ABSTRACT

Embodiments of the invention provide a partition plate capable of efficiently cleaning a medicine remaining in a V-measure. The partition plate comprises: a slide member (8) which is installed so as to be capable of reciprocating along side plates and has a guide reception part (11); and a partition member (9) which has a guide part (18) removably guided by the guide reception part (11) of the slide member (8) and reciprocates together with the slide member (8) while maintaining such a state so as to be parallel with an end plate (5).

9 Claims, 9 Drawing Sheets

(a)

(b)

PARTITION PLATE USABLE FOR V-MEASURE IN MEDICINE HOLDING MACHINE

CROSS-REFERENCE TO RELATED APPLICATIONS

This application is a 35 U.S.C. §371 US National Stage filing of International Application No. PCT/JP2007/069817, filed with the Patent Cooperation Treaty on Oct. 11, 2007, and is entitled to priority benefit under 35 U.S.C. §119 to Japanese patent application 2006-281402, filed Oct. 16, 2006, each of which is incorporated herein by reference in its entirety.

TECHNICAL FIELD

The present invention generally relates to a partition plate for use in a V-shaped measure of a medicine packaging machine, and more particularly to a partition plate capable of cleaning up a medicine remaining in a V-shaped measure.

BACKGROUND OF THE INVENTION

There already exists in the art a medicine packaging machine including a V-shaped measure wherein end plates are fixed to both ends of a side plate and an opening and closing plate is provided to allow its lower edge to contact the side plate and be spaced apart therefrom. A partition plate is provided in the V-shaped measure. The partition plate is reciprocatingly moved while being maintained parallel to the end plates. Further, it is positioned at a position corresponding to a partition number of a medicine to be accommodated (a powdered medicine in particular). Thereafter, a medicine is accommodated in the V-shaped measure and is partitioned through a partition container by opening the opening and closing plate. The medicine is then packaged one pack at a time (see, e.g., patent documents 1 and 2).

Patent Document 1: Japanese Patent Publication No. 1985-58136

Patent Document 2: Japanese Utility Model Registration Publication No. 2577449

SUMMARY OF THE INVENTION

However, the above-mentioned prior art partition plates are irremovable with respect to the side plate. Thus, when a medicine remains in the V-shaped measure, a removal operation for such remaining medicine is obstructed. In particular, the partition plate of the latter is configured to be automatically reciprocated by the drive of a motor, thereby being difficult to be manually moved from its stop state. As such, the removal operation of the remaining medicine (particularly between the partition and side plates) becomes difficult. Further, if a medicine remains in the V-shaped measure, then problems such as contamination (i.e., blending of different types of medicines) can be caused when the types of medicines to be accommodated in the V-shaped measure is changed. Accordingly, there is a strong need in the art for a solution to such a problem.

Thus, it is an object of the present invention to provide a partition plate for use in a V-shaped measure of a medicine packaging machine, which allows a medicine remaining in the V-shaped measure to be easily cleaned up.

As means for achieving the above-mentioned object, the present invention relates to a partition plate disposed in a V-shaped measure, wherein end plates are fixed to both ends of a side plate and an opening and closing plate rotates between an opened position and a closed position so that a lower edge thereof can contact the side plate and be spaced apart therefrom. Further, it can be reciprocatingly moved while being maintained parallel to the end plates, thereby adjusting a partition number of a medicine accommodated in the V-shaped measure. The partition plate comprises: a slide member mounted to the side plate and being reciprocatingly movable along the side plate, the slide member including a guide reception portion; and a partition member including a guide portion guided by the guide reception portion of the slide member in a removable manner and being reciprocatingly moved together with the slide member while being maintained parallel to the end plates.

According to the constitution described above, in case of accommodating a medicine in the V-shaped measure, if the slide member is slidably moved up to a predetermined position, then the partition member is also moved up to the predetermined position as the guide portion is guided by the guide reception portion. Further, in case of cleaning up a medicine remaining in the V-shaped measure after the medicine drops from the V-shaped measure by opening the opening and closing plate, the partition member can be simply removed from the slide member by only detaching the guide portion from the guide reception portion. Accordingly, any members cannot be situated inside the V-shaped measure, more specifically in a region where the medicine is accommodated, thereby allowing a smooth cleaning operation. In addition, cleaning the partition member itself is also possible.

It is preferable that the partition member includes a first abutment portion abutting the opening and closing plate at the closed position and a second abutment portion joined to the first abutment portion and abutting the opening and closing plate at the opened position.

According to the constitution described above, since each tapered portion of the partition member can always abut the opening and closing plate during opening and closing of the opening and closing plate, the partition plate can be stably maintained without any vertical movements.

It is preferable that the partition member includes an auxiliary member rotatably mounted thereto. The auxiliary member is rotated in association with a rotation operation of the opening and closing plate and maintains an abutment state with respect to the opening and closing plate.

According to the constitution described above, the partition member can always be in an appropriate position with respect to the slide member, although the opening and closing plate is opened. In addition, the auxiliary member can be positioned to even a region uncovered by the partition member. Accordingly, when a medicine leaks out laterally through a gap formed between the partition member and the opening and closing plate by opening of the opening and closing plate, the auxiliary plate can prevent such leakage.

It is preferable that the guide reception portion of the slide member includes a pair of guide reception plates provided at a predetermined interval and the guide portion of the partition member is slidably disposed between the guide reception plates.

Further, as means for achieving the above-mentioned object, the present invention relates to a partition plate disposed in a V-shaped measure, wherein end plates are fixed to both ends of a side plate and an opening and closing plate is provided so that a lower edge thereof can contact the side plate and be spaced apart therefrom. Further, it can be reciprocatingly moved while being maintained parallel to the end plates, thereby adjusting a partition number of a medicine accommodated in the V-shaped measure. The partition plate comprises: a slide member mounted to the side plate and being reciprocatingly movable along the side plate; and a partition member connected to the slide member so as to be rotated between a partition position at which an inside of the V-shaped measure is partitioned in a slide direction and a withdrawal position outside the V-shaped measure, the partition member being reciprocatingly moved together with the slide member while being maintained parallel to the end plates.

According to the constitution described above, in case of accommodating a medicine in the V-shaped measure, if the slide member is slidably moved up to a predetermined position, then the partition member is also moved up to the predetermined position as the guide portion is guided by the guide reception portion. Also, in case of cleaning up a medicine remaining in the V-shaped measure after the medicine drops from the V-shaped measure by opening the opening and closing plate, the partition member can be withdrawn from the slide member outward of the V-shaped measure. Accordingly, in addition to smoothly cleaning the inside of the V-shaped measure, problems such as loss of the partition member can be prevented.

Figure 1:
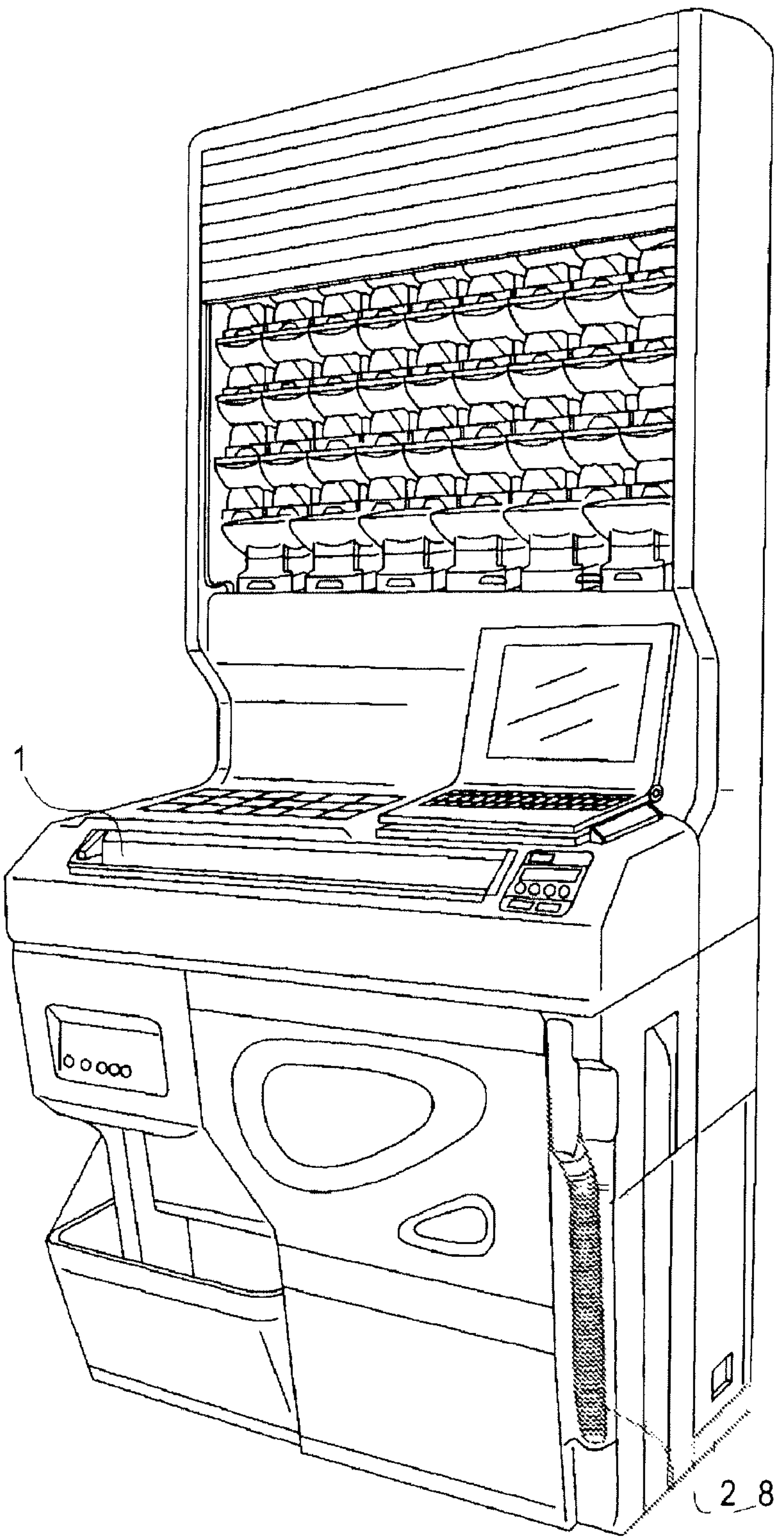
FIG. 1 is a perspective view of a medicine packaging machine according to the present embodiment.

In the drawings, the following reference numbers are used:

1 V-shaped measure,
2 partition container,
3 hopper,
4 side plate,
4*a* upper end portion,
4*b* lower end portion,
4*c*, 4*d* protrusions,
5 end plate,
6 opening and closing plate,
6*a* supporting shaft,
7 partition plate,
8 slide member,
9 partition member,
9*a* side-plate-facing edge portion,
9*b* lower edge portion,
9*c* outer edge portion,
10 slide reception portion,
11 guide reception portion,
12 extension portion,
12*a* through-hole,
13 support plate,
14 roller,
14*a* circumferential groove,
15 detected portion,
16 guide reception portion,
17 guide groove,
18 guide portion,
19 first abutment portion,
20 second abutment portion,
21 auxiliary plate,
21*a* shaft portion,
22 support mount,
23 motor,
24 rack,
25 pinion,
26 encoder,
27 sensor,
28 cleaner, and
29 hinge portion.

DETAILED DESCRIPTION OF THE INVENTION

According to the present invention, the partition plate comprises the slide member and the partition member, which is removable from the slide member. Accordingly, it is possible to appropriately remove a medicine remaining in the V-shaped measure, which was difficult to be cleaned up in the past. In addition, it is easy to clean the partition plate itself.

Embodiments of the present invention will now be described with reference to the accompanying drawings.

First Embodiment

FIG. 1 shows a medicine packaging machine according to the first embodiment of the present invention. The medicine packaging machine of the first embodiment generally includes the following: a V-shaped measure 1; a plurality of partition containers 2 disposed below the V-shaped measure 1; and a conventional packaging device (not shown) having a hopper 3 for sequentially receiving a medicine from each partition container 2.

Figure 2:
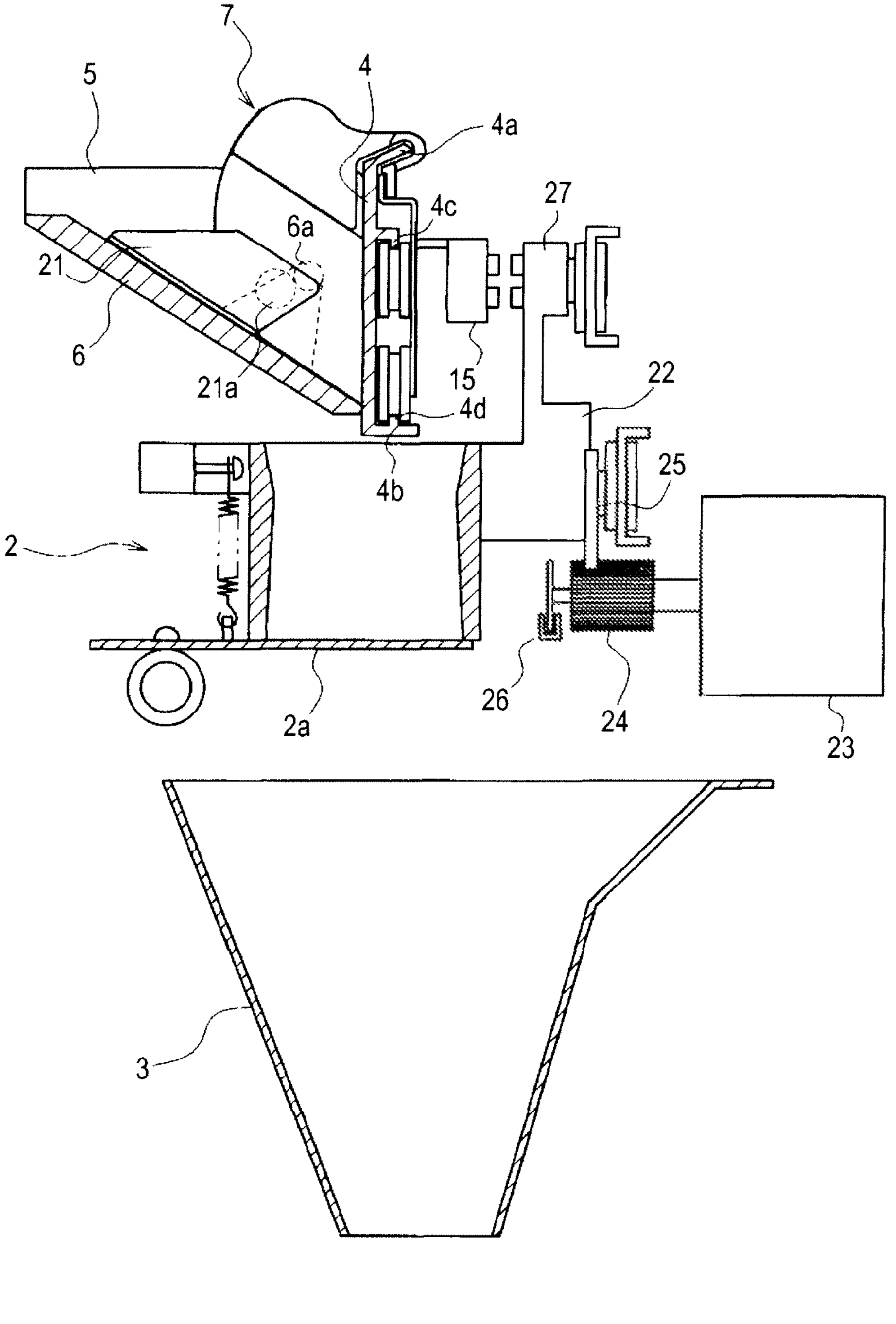
FIG. 2 is a cross-sectional view showing a V-shaped measure shown in FIG. 1.

In the V-shaped measure 1, as shown in FIG. 2, end plates 5 are fixed to both ends of a slide plate 4.

An upper end portion 4*a* of the side plate 4 protrudes slantingly rearward, while a lower end portion 4*b* thereof extends rearward at a right angle (horizontally). A central portion of the lower end portion is formed with a protrusion 4*c*. Further, a back side of the side plate 4 is formed with a protrusion 4*d*, which is opposed to the protrusion 4*c* of the lower end portion.

The end plates 5 are provided with an opening and closing plate 6 that is rotatable about a supporting shaft 6*a*. The opening and closing plate 6 is rotated between an opened position and a closed position by the drive of a motor (not shown). This allows its lower edge to be brought into contact with a lower edge of the side plate 4 and be spaced apart therefrom. In the closed position, the opening and closing plate 6 and the side plate 4 define a substantially V-shaped cross-section.

Further, a partition plate 7 is disposed in the V-shaped measure. The partition plate is configured so as to be capable of changing its position accordingly as the medicine is partitioned into many equal portions.

Figure 3:
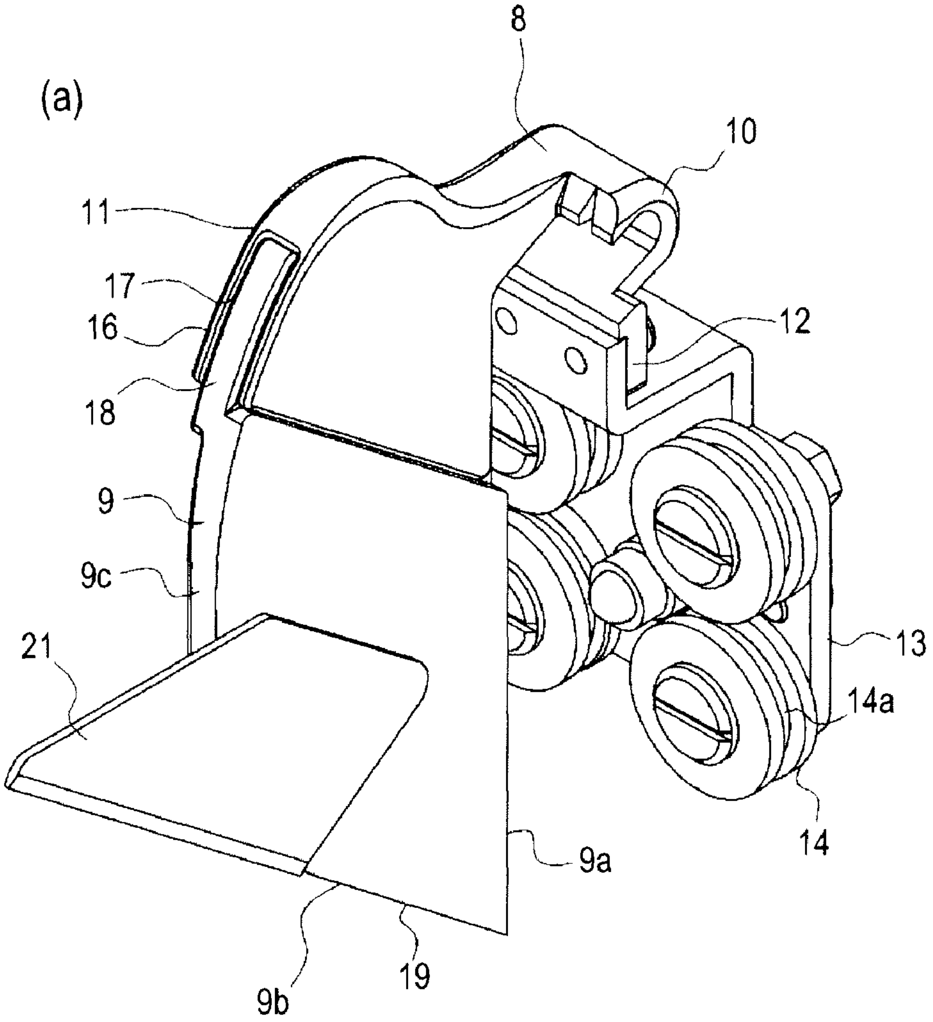
FIG. 3(*a*) is a perspective view of a partition plate and FIG. 3(*b*) is a partially enlarged view of a slide reception portion thereof.
Figure 3:
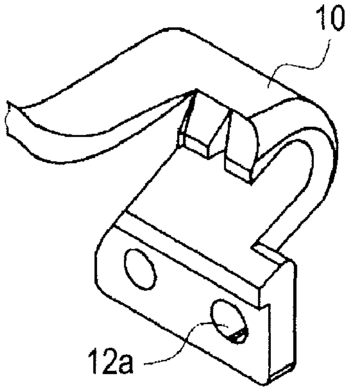

The partition plate 7 comprises a slide member 8 and a partition member 9, as shown in FIGS. 3(*a*) and 7.

The slide member 8 includes: a slide reception portion 10 slidably and movably guided along the upper edge portion of the side plate 4; and a guide reception portion 11 extending from the slide reception portion 10 frontward of the side plate 4 (i.e., inward of the V-shaped measure 1).

The slide reception portion 10 has a U-shaped cross-section. The slide reception portion is reciprocatingly moved along the upper end portion 4*a* that is slantingly rearwardly protruding from the side plate 4 while being guided by the upper end portion 4*a*. An extension portion 12 extends from one end portion of the slide reception portion 10 (i.e., an end portion of the slide reception portion placed at the back side of the slide plate 4). As shown in FIG. 3(*b*), two through-holes 12*a*, through which a support plate 13 is secured using a screw, are formed at a lower side of the extension portion 12.

A pair of rollers 14, which are vertically arranged, is rotatably mounted to one side of the supporting plate 13, which faces the side plate. A peripheral surface of the roller 14 is formed centrally along its circumferential direction with a circumferential groove 14*a*. The protrusions 4*c*, 4*d*, which are formed vertically on the back side of the side plate, are placed and guided on the circumferential groove 14*a*. Further, the supporting plate 13 is provided at its other side, which is not facing the side plate 4, with a detected portion 15 including a pair of permanent magnets that is vertically arranged. The detected portion 15 is detected by a sensor 27, which will be described later, and is used to identify a position of the partition plate 7.

The guide reception portion 11 extends from the slide reception portion 10 in a gradually expanding manner to occupy an upper side of the V-shaped measure. An edge portion of the guide reception portion 11, which faces the side plate, is situated such that a small gap is formed from the upper end portion of the side plate 4 along a front side thereof, thereby avoiding interference during a sliding movement (i.e., occurrence of friction resistance). Further, an edge portion of the guide reception portion 11, which is opposed to the side plate 4, bulges in a circular arc shape. This enhances its rigidity so as to be hardly damaged while facilitating the slide movement without hurting a user when held by the user. Furthermore, a lower half section of the guide reception portion 11 defines a guide groove 17, in which a guide portion 18 of the partition member 9 (as will be described later) is located, by guide reception plates 16 opposed to each other with a predetermined gap. A lower edge of the guide reception plate 16 (including a bottom surface of the guide groove 17) is situated parallel to the opening and closing plate 6 which is in the closed position.

Further, reciprocating movements of the partition plate 7 (i.e., slide member 8) may be carried out by the drive of a motor (not shown) or conducted manually as directly held by a user.

The partition member 9 can be formed by molding synthetic resins material. An upper side of the partition member 9 is formed with the guide portion 18, which is slidably disposed in the groove portion. A side-plate-facing edge portion 9*a* of the partition member 9 is linearly shaped and abuts the side plate 4. A lower edge portion 9*b* of the partition member 9 is inclined with respect to the side-plate-facing edge portion 9*a* and defines a first abutment portion 19, which abuts the opening and closing plate 6 which is in the closed position. An edge portion 9*c* (outer edge portion) of the partition member 9, which is joined to the lower edge portion 9*b* and is opposed to the side-plate-facing edge portion 9*a*, is formed with a second abutment portion 20 that abuts the opening and closing plate 6 which is in the opened position. The remainder of the outer edge portion 9*c* is formed in a circular arc shape or in a multi-tapered shape so as to conform to a rotation trace of the opening and closing plate 6. An upper edge portion and a lower edge portion of the guide portion 18 are parallel. Thus, when the partition member 9 is slidably moved, the guide portion 18 and the lower edge portion 9*b* slide slantingly upwardly along the guide groove 17 of the guide reception portion 11 and the opening and closing plate 6 which is in the closed position, respectively. Further, an occupation space in a height direction of the partition member 9 is sized such that partitioning of a medicine can be well performed even in case of a maximum amount of a medicine contained in one pack.

Further, an auxiliary plate 21 is mounted to the partition member 9 so as to be rotatable about a shaft portion 21*a*. The shaft portion 21*a* is secured to the auxiliary plate 21 at a section of the V-shaped measure where the medicine is not accommodated. Only the auxiliary plate 21 is placed at a section of the V-shaped measure where the medicine is accommodated. Further, the shaft portion 21*a* is positioned near the supporting shaft 6*a*, which is a rotation center of the opening and closing plate 6. The auxiliary plate 21 is thin-plate-shaped. One end of the lower edge portion of the auxiliary plate is located at a boundary between the first abutment portion 19 and the second abutment portion 20 of the partition member 9. Further, an inclined edge portion inclined with respect to the lower edge portion is formed at the other end of the lower edge portion. Also, when the opening and closing plate 6 is in the closed position, the lower edge portion abuts the opening and closing plate 6 together with the first abutment portion 19 of the partition member 9 so as to extend in the same line. On the other hand, when the opening and closing plate 6 is in the opened position, the lower edge portion abuts the opening and closing plate 6 together with the second abutment portion 20 of the partition member 9. Thus, although the opening and closing plate 6 is rotated, the auxiliary plate 21 always maintains an abutment state with respect to the opening and closing plate 6. As such, it covers a gap formed between the outer edge portion of the partition member 9 and the opening and closing plate 6, thereby preventing the medicine from overflowing laterally (not down to the partition container 2).

As shown in FIG. 2, the partition containers 2 are disposed below the V-shaped measure 1. Further, the partition containers are configured such that at least as many ones as a package number (the partition number of a medicine accommodated in the V-shaped measure 1) can be continuously arranged without any gaps. The partition container 2 is supported by a supporting mount 22. It is reciprocatingly movable along a length direction of the V-shaped measure 1 through an interposed rack 24 and a pinion 25 by the drive of a motor 23. A revolution amount, a revolution angle, a revolution position, etc. of the motor 23 are detected by an encoder 26. Further, a sensor 27 is provided on the supporting mount 22 to detect the detected portion 15 provided on the supporting plate 13. The medicine, which drops from the V-shaped measure by opening the opening and closing plate 6 in a position where the sensor 27 detects the detected portion 15, is equally partitioned by and received in the partition containers 2 as many as the partition number set through the partition plate 7. A bottom plate 2*a*, which can be opened and closed, is provided at a bottom of each partition container 2. As the bottom plates 2*a* are opened one after the other, the partitioned medicine is fed to the packaging device and is then packaged one pack at a time.

The medicine packaging machine described above equally partitions a medicine and packages the same as follows.

Figure 4:
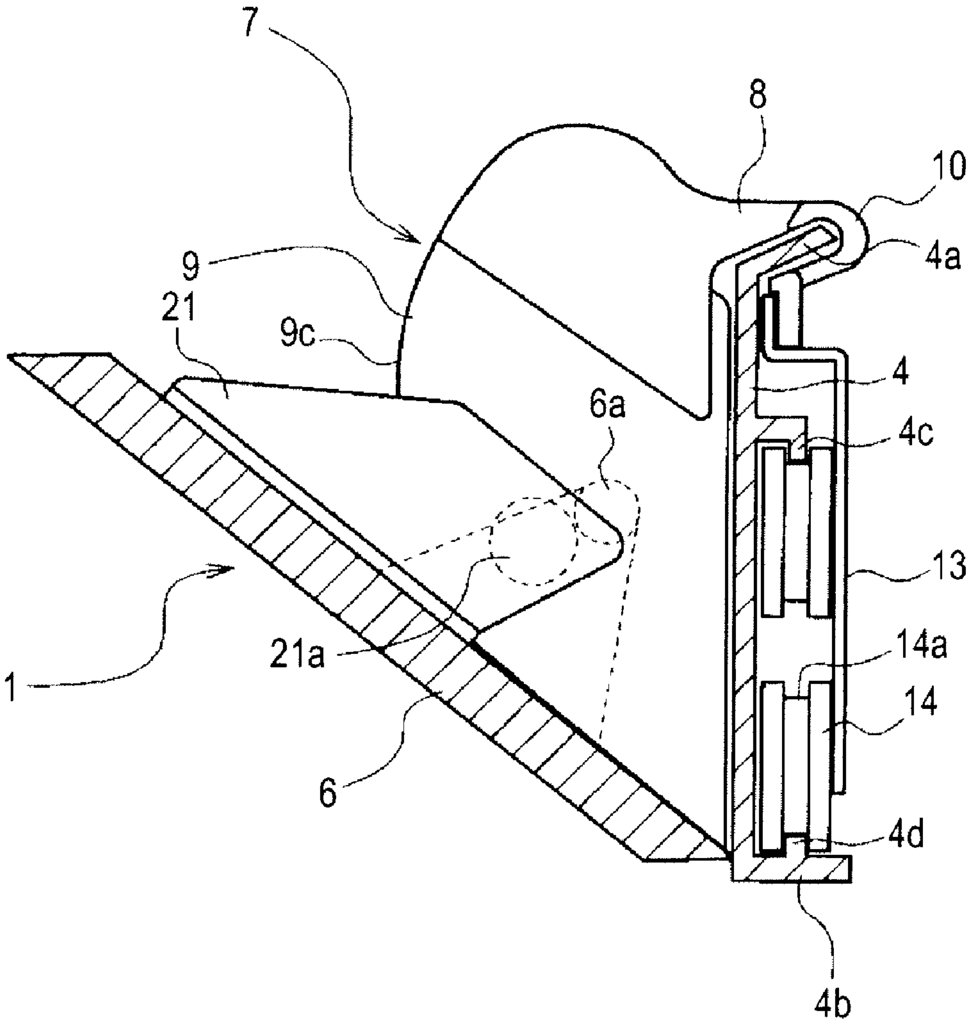
FIG. 4 is a cross-sectional view showing an opening and closing plate which is in a closed position.

First, the partition plate 7 is moved manually or by means of the drive of a motor (not shown) and is stopped at a position where a partition number corresponding to the number of packs to be packaged is accomplished. Then, the medicine is accommodated in the V-shaped measure 1. In such a case, as shown in FIG. 4, the partition member 9 of the partition plate 7 allows its first abutment portion 19 to abut a surface of the opening and closing plate 6, which is inclined in the closed position, by means of its own weight. Also, a reaction force caused by such abutment allows the side-plate-facing edge portion 9*a* to abut a surface of the side plate 4. Thus, an excellent partition state can be accomplished. Further, the motor 23 is driven and each partition plate 2 is moved so that all the medicines dropping from the V-shaped measure 1 can be collected by the partition plates 2.

Figure 5:
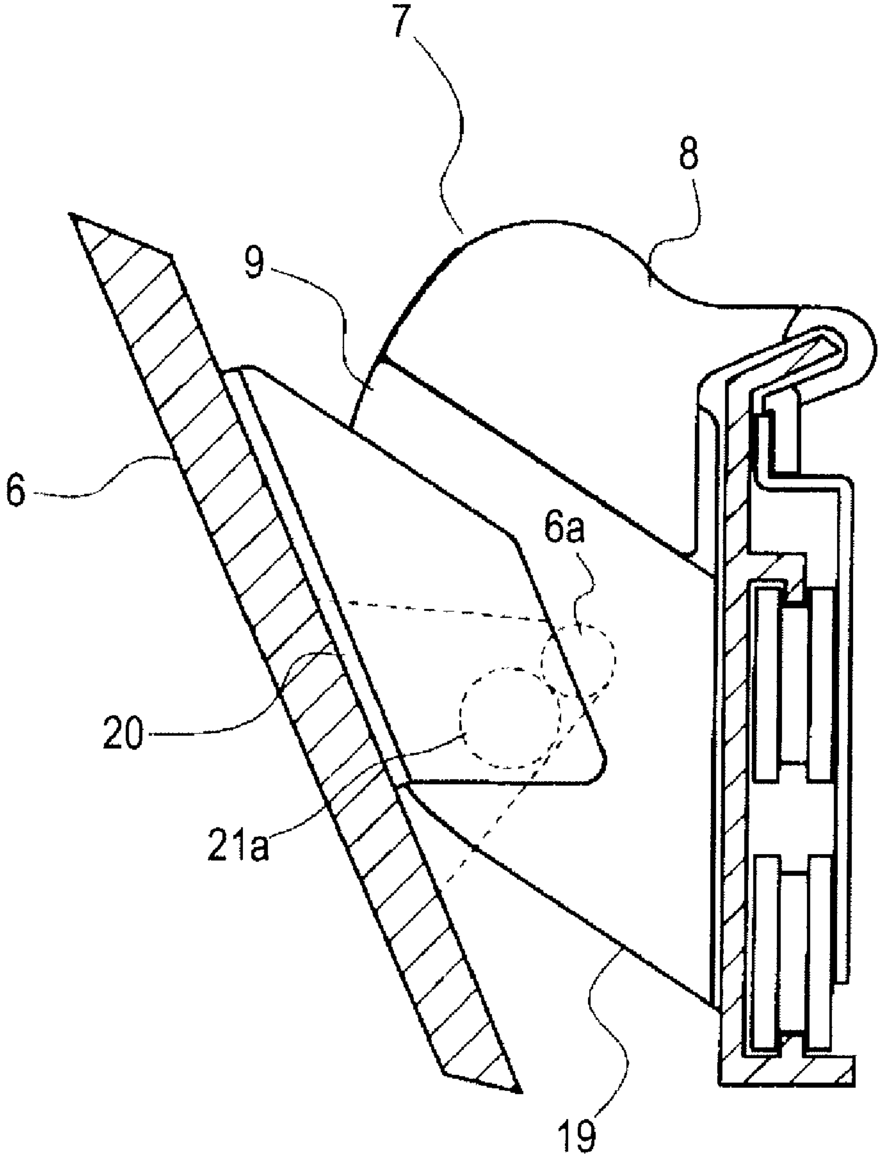
FIG. 5 is a cross-sectional view showing an opening and closing plate which is in an opened position.

Subsequently, the opening and closing plate 6 is rotated about the supporting shaft 6*a* by the drive of a motor (not shown) to thereby be opened as its lower edge portion is spaced apart from the side plate 4. In such a case, the partition member 9 gradually releases an abutment state of the first abutment portion 19 from a state where the first abutment portion abuts the opening and closing plate 6 which is in the closed position, while the second abutment portion 20 approaches the opening and closing plate 6. Also, the second abutment portion 20 abuts the opening and closing plate 6 when in the opened position of the opening and closing plate 6, as shown in FIG. 5, and a further opening operation is prohibited. The auxiliary plate 21 is rotated about the shaft portion 21*a* while maintaining its abutment state with respect to the opening and closing plate 6. That is, no gap is formed in the partition position accomplished by the partition plate 7, although the opening and closing plate 6 is opened. Further, since it maintains its abutment state with respect to the opening and closing plate 6 and the side plate 4 due to the weight of the partition member 9 during a rotation of the opening and closing plate 6, it is difficult to form a gap compared to the prior art and an excellent partition state can be accomplished. Accordingly, all the medicines dropping from the V-shaped measure are collected by the partition containers 2 located below without laterally overflowing and are equally partitioned.

Next, the partition containers 2 are again moved by the drive of the motor 23 and are situated above the hopper 3 one after the other. Thereafter, the bottom plates of the partition containers 2 situated above the hopper 3 are opened one after the other and the medicine is packaged one pack at a time.

Figure 6:
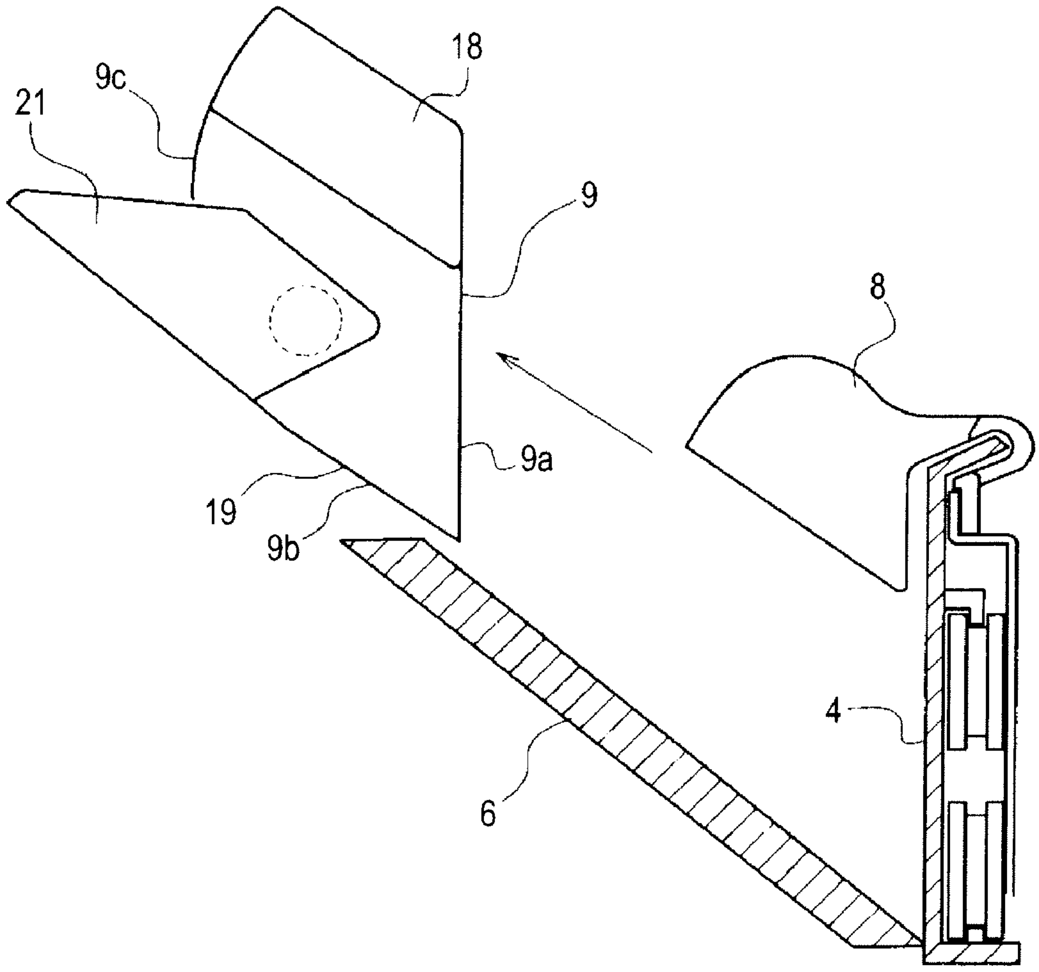
FIG. 6 is a cross-sectional view showing a partition member which is removed from a slide member.
Figure 7:
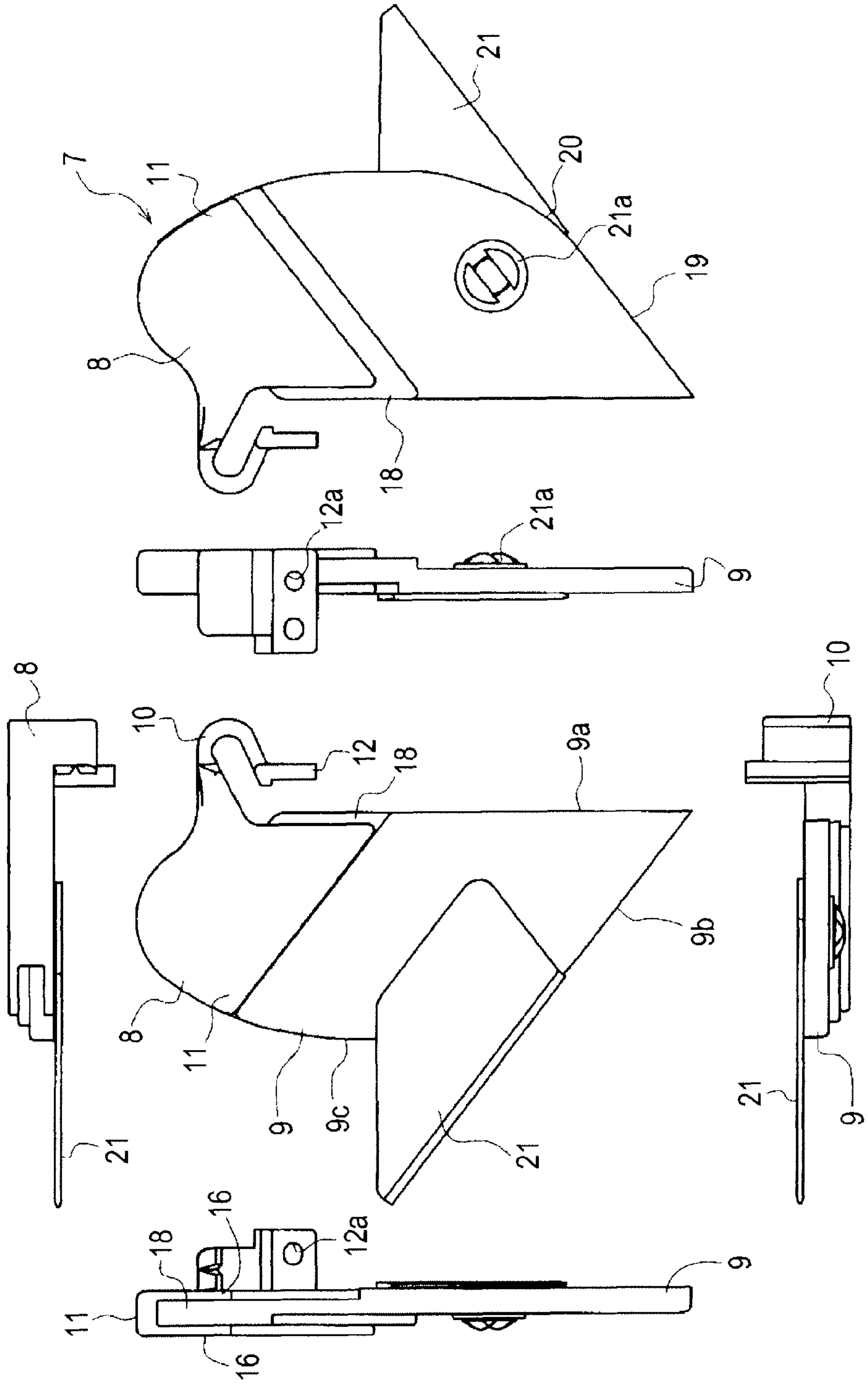
FIG. 7 shows six views of a partition plate according to a first embodiment of the present invention.

As such, the medicine in the V-shaped measure is divided into the partition containers 2 and is then packaged one pack at a time in the packaging device. Thereafter, cleaning of the V-shaped measure 1 is conducted before feeding the next medicine into the V-shaped measure. Such cleaning of the V-shaped measure 1 is performed such that a cleaner 28 (which is equipped in the medicine packaging machine) sucks in the remaining medicine. Before such cleaning, however, the partition member 9 of the partition plate 7 is removed as shown in FIG. 6. Since the partition member 9 is situated with its guide portion 18 guided by the guide reception portion 11 of the slide member 8, it can be simply removed by holding and slantingly upward sliding it along the opening and closing plate 6. Accordingly, it is possible to simply and completely remove even a medicine remaining in a section concealed by the partition plate 7, which was difficult to be cleaned in the prior art. In addition, cleaning of the partition plate 7 can be easily performed.

Further, when such cleaning is completed, the partition member 9 can simply return to its original state by guiding its guide portion between the guide reception portions 11 of the slide member 8 while it slides along the opening and closing plate 6.

Second Embodiment

Figure 8:
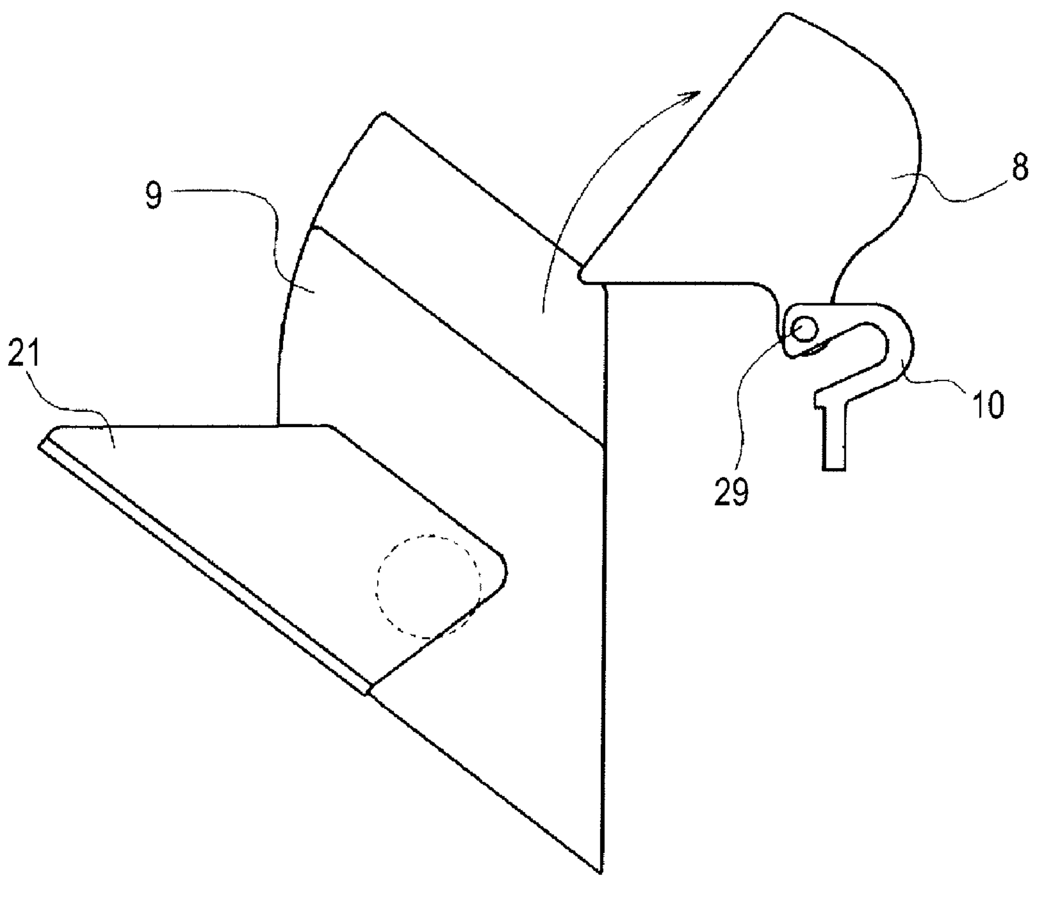
FIG. 8 is a front view showing the separation of a partition plate according to a second embodiment of the present invention.
Figure 9:
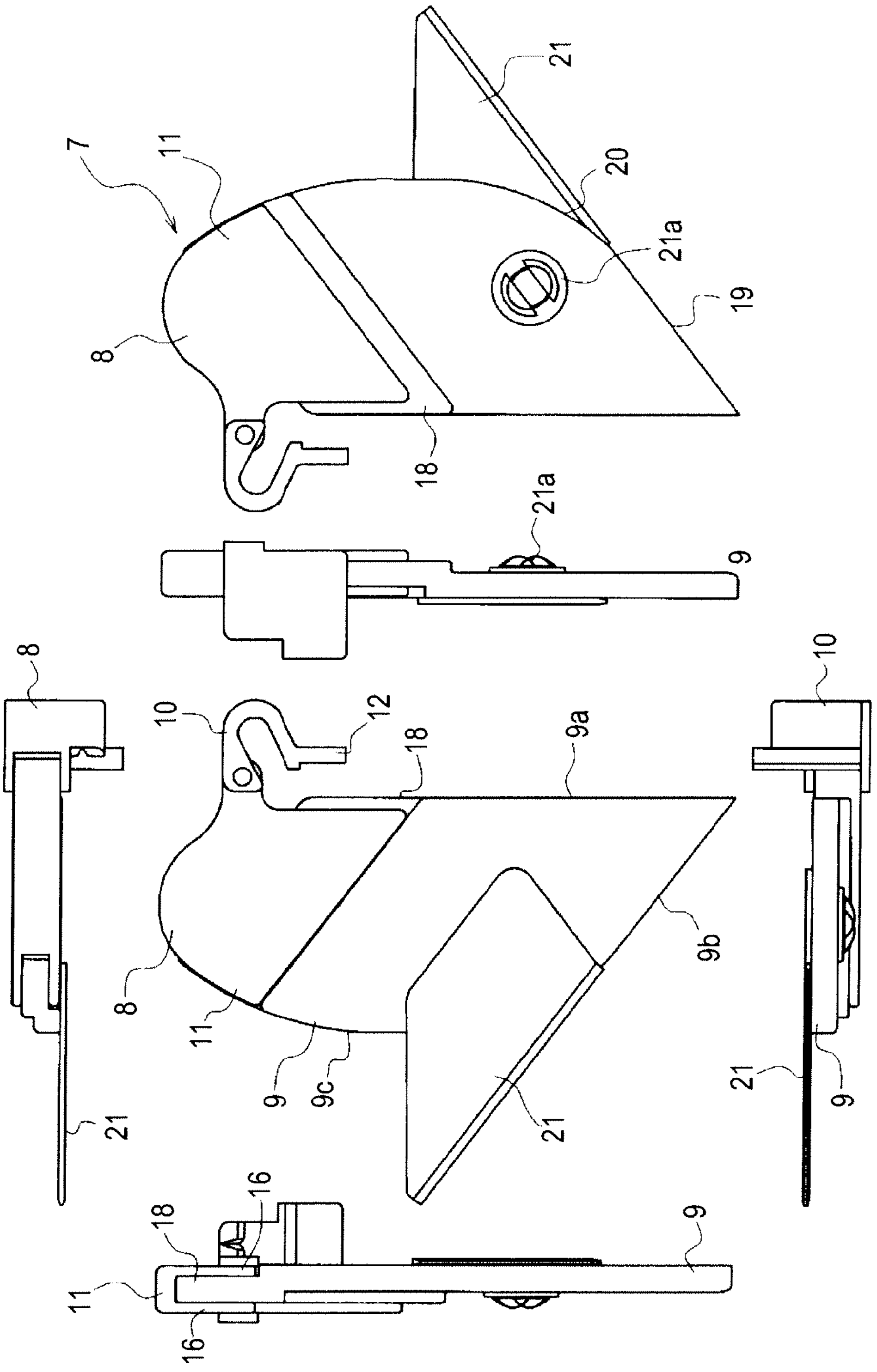
FIG. 9 shows six views of a partition plate according to the second embodiment of the present invention.

FIGS. 8 and 9 show a partition plate 7 according to a second embodiment of the present invention.

The partition plate 7 of the second embodiment is formed similarly to that of the first embodiment except that a leading end portion of the slide member 8, namely, its guide reception portion 11 side, is connected to the slide reception portion 10 side so as to be rotatable about a hinge portion 29.

With the partition plate 7 constituted as such, in case of cleaning the inside of the V-shaped measure, the partition member 9 can be easily removed from the inside of the V-shaped measure by rotating the guide reception portion 11 side of the slide member 8 about the hinge portion 8 as shown in FIG. 8. In addition, a portion of the slide member 8, which is placed inside the V-shaped measure 1 (including its upper side), can also be withdrawn. Accordingly, cleaning the inside of the V-shaped measure can be smoothly performed without any obstruction.

Furthermore, the partition member 9 can be removed prior to rotating a portion of the slide member 8 by being slidably moved along the opening and closing plate 6 similarly to the first embodiment.

The invention claimed is:

1. A partition plate for use in a V-shaped measure of a medicine packaging machine, the partition plate being disposed in a V-shaped measure, wherein end plates are fixed to both ends of a side plate and an opening and closing plate rotates between an opened position and a closed position so that a lower edge thereof can be brought into contact with and spaced apart from the side plate, the partition plate being reciprocatingly moved while being maintained parallel to the end plates to thereby adjust a partition number of a medicine accommodated in the V-shaped measure, the partition plate comprising:

a slide member mounted to the side plate and being reciprocatingly movable along the side plate, the slide member including a guide reception portion; and a partition member including a guide portion guided by the guide reception portion of the slide member in a removable manner, the partition member being reciprocatingly moved together with the slide member while being maintained parallel to the end plates.

2. The partition plate for use in a V-shaped measure of a medicine packaging machine according to claim 1, wherein the partition member includes a first abutment portion abutting the opening and closing plate at a closed position and a second abutment portion joined to the first abutment position and abutting the opening and closing plate at an opened position.

3. The partition plate for use in a V-shaped measure of a medicine packaging machine according to claim 2, wherein the partition member includes an auxiliary member rotatably mounted thereto, the auxiliary member being rotated in association with a rotation operation of the opening and closing plate and maintaining an abutment state with respect to the opening and closing plate.

4. The partition plate for use in a V-shaped measure of a medicine packaging machine according to claim 3, wherein the guide reception portion of the slide member includes a pair of guide reception plates provided at a predetermined interval and the guide portion of the partition member is slidably disposed between the guide reception plates.

5. The partition plate for use in a V-shaped measure of a medicine packaging machine according to claim 2, wherein the guide reception portion of the slide member includes a pair of guide reception plates provided at a predetermined interval and the guide portion of the partition member is slidably disposed between the guide reception plates.

6. The partition plate for use in a V-shaped measure of a medicine packaging machine according to claim 1, wherein the partition member includes an auxiliary member rotatably mounted thereto, the auxiliary member being rotated in association with a rotation operation of the opening and closing plate and maintaining an abutment state with respect to the opening and closing plate.

7. The partition plate for use in a V-shaped measure of a medicine packaging machine according to claim 6, wherein the guide reception portion of the slide member includes a pair of guide reception plates provided at a predetermined interval and the guide portion of the partition member is slidably disposed between the guide reception plates.

8. The partition plate for use in a V-shaped measure of a medicine packaging machine according to claim 1, wherein the guide reception portion of the slide member includes a pair of guide reception plates provided at a predetermined interval and the guide portion of the partition member is slidably disposed between the guide reception plates.

9. A partition plate for use in a V-shaped measure of a medicine packaging machine, the partition plate being disposed in a V-shaped measure, wherein end plates are fixed to both ends of a side plate and an opening and closing plate is provided so that a lower edge thereof can be brought into contact with and spaced apart from the side plate, the partition plate being reciprocatingly moved while being maintained parallel to the end plates to thereby adjust a partition number of a medicine accommodated in the V-shaped measure, the partition plate comprising:

a slide member mounted to the side plate and being reciprocatingly movable along the side plate; and a partition member connected to the slide member so as to be rotated between a partition position at which an inside of the V-shaped measure is partitioned in a slide direction and a withdrawal position outside the V-shaped measure, the partition member being reciprocatingly moved together with the slide member while being maintained parallel to the end plates.

* * * * *